Aug. 14, 1928.  1,680,961
J. H. VAN PUTTEN ET AL
TIRE COVERING
Filed Aug. 5, 1926
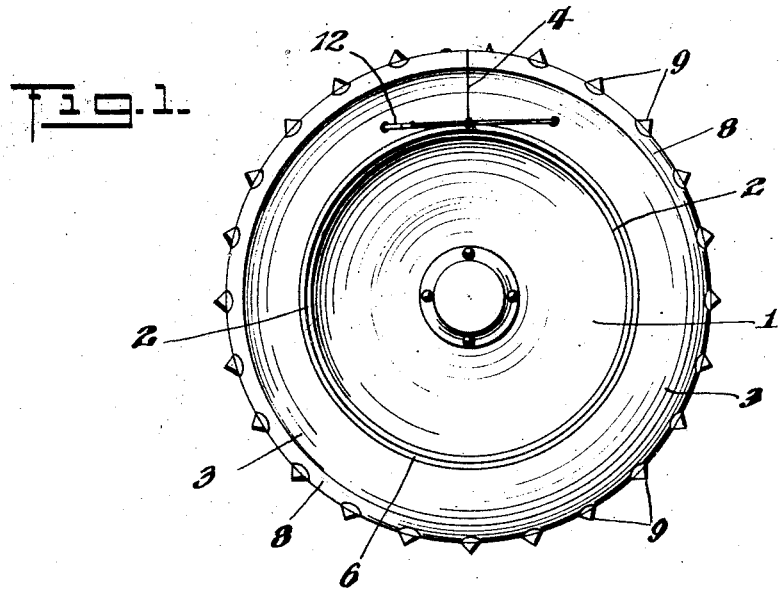
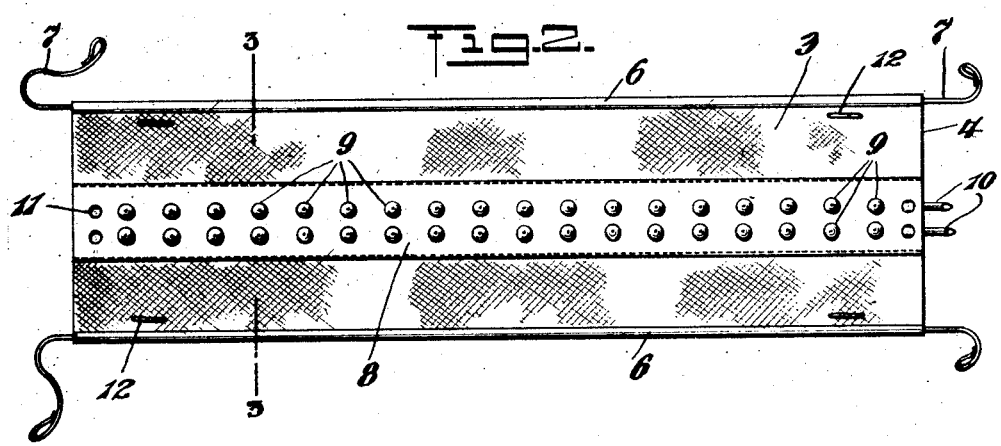
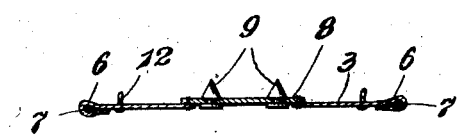
INVENTORS
James H. Van Putten
James H. Sharpe.
BY
Howard P. King
ATTORNEY Patented Aug. 14, 1928.

1,680,961

UNITED STATES PATENT OFFICE.

JAMES H. VAN PUTTEN AND JAMES H. SHARPE, OF NEW YORK, N. Y.

TIRE COVERING.

Application filed August 5, 1926. Serial No. 127,256.

This invention relates to tire covers, and more particularly to a covering which is applicable more especially to the ordinary automobile tire by the user of the same either before or after the tire has been in use.

The objects of the invention are to provide a protective covering for a tire to not only prolong its life but to obtain improved traction and puncture resisting qualities; to enable the covering to be conveniently and properly applied by persons having no particular adaptation to the use of tools or mechanical ability; to provide a structure which may be carried when not in use in small space and without damage to the said cover; to enable the covering to be applied to a tire without jacking up the vehicle, or if the vehicle is jacked up without requiring the vehicle to be jacked more than enough to just loosen the wheel from the ground; to enable a covering to be constructed partly of cheap material and partly of material of a more expensive and durable nature; to obtain equal tension on the covering at all points of its circumference; to enable the covering to be manufactured in in a minimum number of sizes and adjusted to intermediate sizes when applied to the tire; to secure simplicity of construction and application, practicability and durability, and to obtain other advantages and results as may be brought out in the following description.

Referring to the accompanying drawing in which like numerals of reference indicate similar parts throughout the several views:

Figure 1 is a side elevation of a wheel to which our invention has been applied;

Figure 2 is a face view of the covering spread out flat; and

Figure 3 is a sectional view showing the construction of spike or stud and the manner in which the same is mounted on the cover.

In the specific embodiment of the invention illustrated in said drawing, the reference numeral 1 indicates a wheel on which is mounted a tire 2. While the invention is shown and intended more especially for use in connection with automobiles, we do not confine ourselves to such use and have shown and described the invention in this connection only for the purpose of being definite. Said wheel and tire are of any ordinary and usual construction, the invention being applicable to new tires or tires which have never been used as well as upon used tires on which the tread has been worn down more or less.

The cover preferably comprises a flexible casing 3 which will take the shape of the tire in the nature of a torus. Said casing, however, is separable at one portion thereof, as at 4, enabling the same to be opened up and laid out substantially flat on the ground or elsewhere. This arrangement accordingly enables the user to lay the casing down on the ground and roll the vehicle so the wheels will ride upon the said casing at which time the ends may be brought around the tire so as to enclose the tire with said casing. Means are provided for keeping the ends together, and the casing thereupon retains the shape of the tire and travels with it.

The preferred means and the one which is shown, for holding the casing together is preferably flexible so as to accommodate deflection of the tire and also to enable the casing to be rolled or folded or crumpled into a small space when not in use. We have shown the longitudinal edges of the casing to be hemmed, as at 6, and a draw string, cord or the like, 7 is enclosed within the said hem with its ends projecting from the opposite ends of the casing. The projecting ends of said cord on each face of the tire are drawn toward each other and tied or otherwise secured, thereby holding the casing in place on the tire. It will be observed by this means that an equal tension is secured all the way around the said casing and also that a very simple construction is secured requiring no tools or any particular mechanical knowledge to apply the invention. Of course if it is preferred to jack up the car, the casing may be applied with a wheel loosened from the ground, but because of the flexibility of the casing and its nature, it is only necessary to raise the wheel a very slight distance from the ground.

It is also to be noted that the casing may be made in a length sufficient to accommodate tires having circumferences of varying lengths within the range of the width of the tire. The hem is merely opened a greater distance in from the end of the casing for smaller tires than it is for larger tires in order to enable the tie-cord to be pulled up and effectively secure the casing in position tightly upon the tire.

The casing preferably utilizes a leather tread 8 secured to a body portion of some inexpensive material but sufficiently effective for the purpose of holding the casing on the tire and in shape. The body portion may be of such material as canvas, duck and the like since it receives very little wear and is otherwise amply strong for the purpose for which it is used. Preferably the leather tread mounts studs 9 which form non-skid means as well as resistive armor for the covering. These studs preferably are riveted to the leather with wide shoulders above and below the leather to prevent said studs from being pulled or knocked loose or from wearing out the leather where supported.

As the tire covering is preferably constructed, the length of the same is preferably just enough to obtain a butt joint at the meeting ends, as indicated in Figure 1. Furthermore, it is also a part of the present invention to provide holding means in addition to the edge cords 7, such additional means being herein illustrated as hooks 10 carried by the leather tread at one end thereof and adapted to hook into holes 11 at the other end thereof when the two ends are brought together. The ends of the hooks project outwardly through said holes 11 and constitute in effect studs to supplement studs 9 above described. It may likewise be here noted that suitable means, such as hooks 12, may be provided for receiving and holding the otherwise loose ends of the tying cords 7, these hooks being shown adjacent to the hem so as to be in a place convenient to the cords and also away from the tread where the wear would damage them.

Obviously detail changes and modifications may be made in the construction and use of our improved tire covering, and we do not wish to be understood as limiting ourselves to the exact construction shown except as set forth in the following claim when construed in the light of the prior art.

Having thus described the invention, we claim:—

A tire covering comprising a leather tread portion, and strips independent of each other secured to the opposite longitudinal edges of said tread portion, said strips being of fabric and having means for securing the ends thereof together on a vehicle wheel.

In witness whereof we have hereunto set our signatures.

JAMES H. van PUTTEN.
JAMES H. SHARPE.